Dec. 16, 1947. E. F. ROSSMAN 2,432,937

SHOCK ABSORBER

Filed Oct. 6, 1945

INVENTOR
EDWIN F. ROSSMAN
BY
Spencer, Hardman and Jehu
HIS ATTORNEYS

Patented Dec. 16, 1947

2,432,937

UNITED STATES PATENT OFFICE 2,432,937

SHOCK ABSORBER

Edwin F. Rossman, Dayton, Ohio, assignor to General Motors Corporation, Detroit, Mich., a corporation of Delaware Application October 6, 1945, Serial No. 620,752

8 Claims. (Cl. 188—88)

This invention relates to improvements in shock absorbers, and particularly to double-acting shock absorbers of the direct-acting type.

It is among the objects of the present invention to provide an hydraulic shock absorber in which mixing of the fluid and air therein is reduced to a minimum.

A further object of the present invention is to provide an hydraulic shock absorber with means for controlling fluid movement in the reservoir so that agitation of the fluid due to the jarring and shaking of the shock absorber by the vehicle upon which it is installed is substantially confined to a shallow portion adjacent the fluid level.

Further objects and advantages of the present invention will be apparent from the following description, reference being had to the accompanying drawings wherein a preferred embodiment of the invention is clearly shown.

Figures 1, 2, 3, 4:
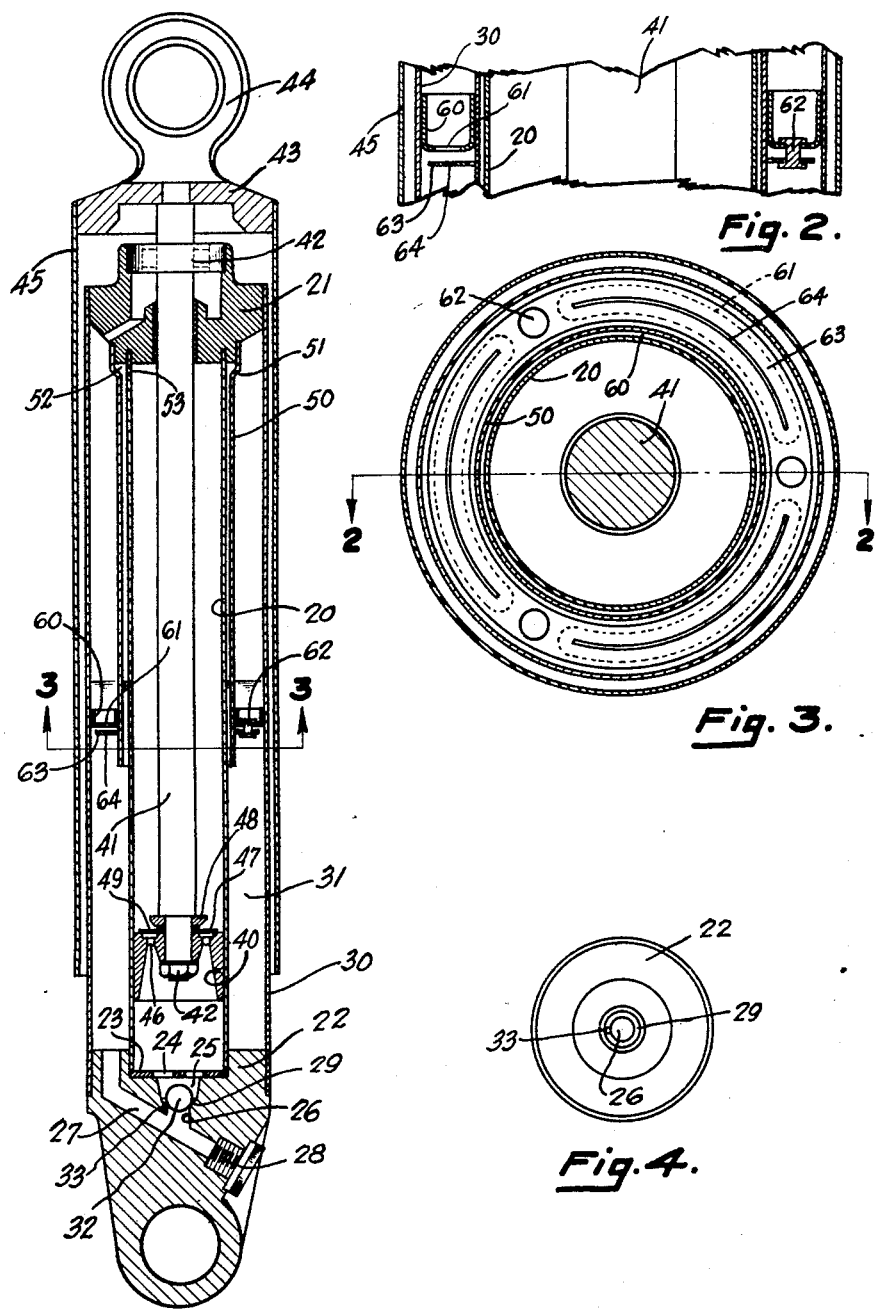
Fig. 1 is a longitudinal sectional view of the shock absorber equipped with the present invention.
Fig. 2 is a fragmentary sectional view taken along the line 2—2 of Fig. 3.
Fig. 3 is a transverse section at an enlarged scale taken along the line 3—3 of Fig. 1.
Fig. 4 is a detailed view of the lower closure member of the shock absorber cylinder.

Referring to the drawings, the numeral 20 designates the cylinder, one end of which is embedded in an annular groove formed in the upper closure member 21, the other end of which fits into a recess in the lower closure member 22. A disc 23 is interposed between the lower end of the cylinder and the bottom of the recess into which said cylinder fits, this disc having a plurality of apertures 24 arranged in a circular row and communicating with a recess 25 in the closure member 22, said recess in turn communicating with a smaller diameter duct 26 leading to the transverse duct 27 in the closure member 22.

Another tubular member 30 surrounds the cylinder 20, one end of the tube 30 fitting about the closure member 21, the other about the closure member 22 so as to be held substantially coaxial of the cylinder 20. This tube 30 is termed the reservoir tube and forms the annular space about the cylinder which is referred to hereinafter as the reservoir 31.

The duct 27 in the closure member 22 has one end opening into the reservoir 31, the other end being provided with a plug 28 for closing and sealing this end of the duct. Duct 26 is of lesser diameter than the recess 25 and thus presents an annular shoulder 29 forming a seat for the ball check valve 32. A notch 33 is cut in this seat 29 so that ball check valve 32 does not completely close the duct 26 when said valve is seated upon the annular seat 29. The ball check valve 32 is confined within the recess 25 by the apertured disc 23.

A piston 40 is reciprocative in cylinder 20, said piston being secured to one end of the piston rod 41 by a nut 42, this rod extending through a bearing in the closure member 21 and through a packing gland 42 also secured in said closure member. The end of the rod extending beyond the packing gland 42 has a head 43 secured thereto which is provided with a mounting ring 44. A tube 45 is secured to the head 43, this tube being slightly larger in diameter than the tube 30 over which it telescopically fits and thus provides a dust or protective cover for the reservoir tube 30.

The piston 40 has passages 46 extending therethrough providing for the transfer of fluid from one side of the piston to the other as the piston is reciprocated in the cylinder. A resilient disc valve 47 is clamped between the piston and a collar 48 on the piston rod, the annular peripheral edge of said valve disc being urged into tight engagement with the piston to shut off the passages 46 therethrough. Orifices 49 are provided in the disc valve 47, the fluid flow capacity of orifices 49 being comparatively less than the fluid flow capacity of the piston passages 46. Thus when the piston is moved downwardly in the cylinder 20, fluid therebeneath is forced through the orifice presented by the notch 33 in the valve seat 29, thence through ducts 26 and 27 into the reservoir. If this fluid flow is not sufficient to relieve the fluid pressure beneath the cylinder, then the disc valve 47 is flexed and its peripheral edge is lifted from engagement with the piston, establishing a controlled fluid flow from beneath the piston to the upper side thereof. On the contrary, when the piston is moved upwardly in the cylinder, valve 47 is tightly seated upon the piston and fluid may then flow through the orifices 49 from the chamber above the piston through passages 46 to the chamber beneath the piston. At the same time this upward movement of the piston causes fluid to flow from the reservoir through ducts 27 and 26, lifting valve 32 to establish a substantially less restricted fluid flow through the recess 25 and openings 24 into the cylinder chamber beneath the piston, to compensate for the fluid displaced by the rod 41.

The cylinder closure member 21 has a third tubular member 50 secured thereto so as to be substantially coaxial of the cylinder 20. This tube 50 forms a comparatively thin annular space around the cylinder, the lower end of the tube extending a predetermined distance beneath the level of the fluid within the fluid reservoir. The upper end of this tube 50 is flared as at 51, thus forming an enlarged annular chamber 52 into which an orifice 53 in the cylinder adjacent the closure member 21 may discharge fluid upon the upward movement of the piston 40 in the cylinder 20.

The discharging of the fluid into the enlarged annular space 52 and thence downwardly through the smaller annular space between the tube 50 and the cylinder 20 causes the velocity of the discharged fluid to be dissipated without permitting the stream of fluid to be broken up. In dissipating the velocity of the fluid discharged through the orifice 53 the tubular member 50 causes the fluid to spread out in the form of a thin film and flow downwardly to meet the main body of the fluid in the reservoir 31. This action allows the discharged fluid to be returned to said main fluid body in the reservoir with minimum disturbance and with less or no aeration. It is practically necessary in every instance that the tubular member 50 be long enough so that its lower end will always be below the surface of the main body of the fluid in the reservoir regardless of the position of the piston in the cylinder.

The present shock absorber is designed to control the movement between two relatively movable members. Primarily the shock absorber is installed on a motor vehicle to control the movement of the frame and axle of the vehicle. The mounting ring 44 is secured to the frame of the vehicle while the closure member 22 is secured to the axle. As the frame and axle separate the piston is actuated upwardly in the cylinder, thus exerting pressure upon the fluid within the upper or high pressure chamber. This causes said fluid to be forced through the orifice 49 in the disc valve 47 seated on the piston and at the same time causes fluid to be forced through the orifices 53 in the cylinder wall into the annular space 52 and down through the narrow annular space between the tube 50 and the cylinder 20 to the main body of the fluid in the reservoir. Restriction of the fluid flow through the orifices 49 causes the shock absorber to offer resistance to the separating movements of the frame and axle of the vehicle. In order completely to fill the low pressure chamber in the cylinder beneath the piston and due to the displacement of the rod 41 in the upper, high pressure chamber, fluid is taken from the reservoir through the ducts 27 and 26, lifting the valve 32 from its seat 29 and thus establishing unrestricted flow into this lower, pressure chamber in the cylinder.

When the frame and axle of the vehicle move to approach each other, a reverse action of the piston obtains. Now as the piston is urged toward the closure member 22 it exerts pressure upon the fluid within the low compression chamber beneath the piston, the flow first occurring from said chamber through the notch 33 in the valve seat 29 now engaged by the ball check valve 32, this restricted fluid flow from the low compression chamber thus causing the shock absorber to resist approaching movements of the frame and axle of the vehicle. If the fluid pressure in the low pressure chamber beneath the piston is not properly relieved by the orifice 33, then valve 47 is flexed to move from its seat and establish a restricted fluid flow through the piston passages 40 into the upper or high compression chamber.

When installed on a motor vehicle as just described, the shock absorber is subjected to continuous shaking as the vehicle is operated over the highway. The shaking of the shock absorber agitates the fluid in the reservoir and particularly so inasmuch as the reservoir portion of the shock absorber is secured to and moves with the axle of the vehicle on which the wheels are mounted. Agitation of the fluid in the reservoir in the fashion of a cocktail shaker when in use causes the fluid and air within the shock absorber to mix, resulting in an aerated fluid supply in the reservoir. If aerated fluid is drawn into the cylinder beneath the piston past the valve 32, then as the piston moves downwardly it acts upon a body within the cylinder, a part of which, the air therein, is compressible and therefore the shock absorber efficiency is materially affected inasmuch as it will not offer immediate control of frame and axle movements, but causes a lag in the control. This is undesirable. On the other hand, however, if a substantially solid and air free fluid is drawn into the cylinder, then as the piston acts to exert pressure upon such a fluid, no compression, or practically no compression obtains and therefore immediate control by the shock absorber of movement is provided.

The present invention, as has been stated, provides for the substantial reduction or practical elimination of aeration of the fluid due to agitation of the shock absorber during use on a vehicle. To reduce or substantially eliminate aeration of the fluid, the present invention provides a partition 60 in the reservoir secured between the tubular member 50 and the inner wall of the tube 30 forming the reservoir 31. This partition divides the reservoir into two compartments, the partition being positioned in the reservoir or at slightly beneath the lowest level of the fluid therein. The partition in the form of a ring has spaced openings 61 providing for the transfer of fluid through the partition from one compartment of the reservoir into the other. A series of posts 62 are secured to the partition, these posts loosely supporting a ring-shaped disc valve 63 so as normally to maintain the disc valve in spaced relation with the partition as shown in Figs. 1 and 2. Disc valve 63 has narrow slits 64 therein which are equal in number and similarly spaced as the openings 61 in the partition, the posts 62 supporting the valve so that a slit 64 in said valve will coincide with an opening 61 in the partition. When the valve is in the normal position as shown in Figs. 1 and 2, fluid may substantially freely pass through the openings 61 in the partition. However, when the valve 63 is moved into contact with the partition, then fluid may pass only through the slits 64 in the valve, thus substantially reducing the fluid flow capacity of the openings 61 in the partition and thereby restricting the fluid flow through said openings.

When the road wheels of the vehicle strike an obstruction in the surface over which they are rolling, the shock absorber portion including the closure member 22 and the reservoir tube 30 is thrust suddenly upwardly. A resultant downward movement of the fluid in the reservoir obtains and thus valve 63 is held in its normal position which will permit a free movement of the fluid through the partition. On the other hand when the shock absorber portions 22 and 30 are thrust suddenly downwardly due to the road wheels of a vehicle riding down from a bump or dropping into a rut in the surface over which they are being operated, then an upward movement of the fluid in the reservoir obtains. The upward movement of the fluid causes valve 63 to be urged into contact with the partition, thereby valve 63 will reduce the fluid flow capacity of the openings in the partition by moving the slits 64 to coincide with a respective opening. Now this upward fluid movement due to a sudden dropping of the shock absorber parts 22 and 30 will be restricted. The agitation of the fluid will cause aeration thereof adjacent its level, however the presence of the partition and its valve will control the movement of the aerated fluid in the reservoir. As a result, comparatively air free or solid fluid is maintained adjacent the bottom of the reservoir and in the vicinity of the cylinder intake or replenishing valve 32.

From the aforegoing it may be seen that the present invention provides means for preventing aeration of the fluid in an hydraulic shock absorber. The discharged fluid from the orifices 53 in the cylinder has its velocity dissipated by the presence of the tubular member 50, thereby maintaining the disturbance of the fluid to a minimum and thus preventing aeration at this point, while in the reservoir there is provided fluid movement controlling means permitting substantially free movement of the fluid in the reservoir in one direction and restricting the movement thereof in the other direction so as to prevent the comparatively free passing of the solid fluid adjacent the lower end of the reservoir to the upper portion thereof where agitation would cause it to get mixed with air and thus be aerated. The tubular member 50 about the cylinder 20 and the fluid movement controlling partition 60 and its valve 63 cooperate to maintain a substantially air free and solid fluid in the bottom of the reservoir from where this solid fluid is drawn into the shock absorber cylinder, thus maintaining the efficiency required by a shock absorber to provide instant and complete control.

While the embodiment of the present invention as herein disclosed constitutes a preferred form, it is to be understood that other forms might be adopted, all coming within the scope of the claims which follow.

What is claimed is as follows:

1. In a shock absorber having a cylinder within a reservoir, fluid in said cylinder and reservoir, said cylinder having a restricted opening adjacent one end thereof, a piston operable in one direction in said cylinder for forcing fluid above the piston through said restricted opening, means for providing a flow of fluid from the reservoir into the cylinder space below the piston as the piston operates in the same direction, means providing a chamber for receiving fluid discharged through said restricted opening, means forming a passage for conducting the fluid from said chamber to the reservoir fluid, and means in the reservoir for restricting fluid movement therein to a greater degree in one direction than in the other.

2. A shock absorber in accordance with claim 1, in which, however, the means which controls the fluid movement in the reservoir, restricts fluid movement in the direction of the restricted opening to a greater degree than the movement of the fluid in the reservoir toward the opposite end of the shock absorber.

3. In a shock absorber, the combination of a housing having a cylinder therein and a reservoir around the cylinder, fluid in said cylinder and reservoir, said cylinder having a restricted opening adjacent its upper end, a piston operable in one direction in said cylinder for forcing fluid through said restricted opening into the reservoir, means providing for a flow of fluid from the reservoir into the cylinder space below the piston as the piston operates in the same direction, tubular means disposed around said cylinder with a space therebetween for returning the fluid, which is discharged through the restricted opening, to the body of reservoir fluid, and fluid flow controlling means in the reservoir between said tubular means and the inner wall of the reservoir, said controlling means restricting the movement of fluid in the reservoir to a greater degree in one direction than in the other.

4. A shock absorber in accordance with claim 3, in which, however, the fluid flow controlling means provides for a substantially unrestricted movement of fluid in the reservoir toward the bottom thereof and a restriction to the movement of the fluid in the reservoir toward the top thereof.

5. A shock absorber in accordance with claim 3, in which, however, the tubular means disposed around the cylinder forms an annular chamber of greater diameter adjacent the restricted opening in the cylinder than the annular space around said cylinder more remote from the said opening, and fluid flow controlling means in the reservoir, between the said tubular means and the adjacent wall of the reservoir, said controlling means restricting the movement of fluid in one direction in the reservoir to a greater degree than in the other.

6. A shock absorber comprising in combination, a fluid containing reservoir; a cylinder each end of which has an opening communicating with the reservoir; a reciprocative piston forming two working chambers in the cylinder; valve mechanism in the one opening restricting fluid flow therethrough in one direction to a greater degree than in the other direction; a sleeve surrounding the cylinder and extending beneath the level of the fluid in the reservoir, said sleeve forming a comparatively narrow, annular space into which the other opening of the cylinder discharges; and a fluid movement controlling baffle in the reservoir between the sleeve and reservoir wall, said baffle restricting the movement of the fluid in the reservoir away from the valved opening between the cylinder and reservoir, to a greater degree than the movement of the fluid in the reservoir toward said opening.

7. A shock absorber comprising in combination, a fluid containing reservoir; a cylinder each end of which has an opening communicating with the reservoir; a reciprocating piston forming two working chambers in the cylinder; a valve mechanism in the one opening restricting fluid flow therethrough in one direction to a greater degree than in the other direction; a sleeve surrounding the cylinder and extending beneath the level of the fluid in the reservoir, said sleeve forming a comparatively narrow, annular space into which the other opening of the cylinder discharges; and a valved partition in the reservoir, for restraining fluid movement in one direction in the reservoir to a greater degree than in the other direction.

8. A shock absorber comprising in combination, a cylinder having a closure member at each end thereof, said cylinder having a discharge opening adjacent the one closure member; a tube secured between the two closure members and forming a fluid containing reservoir about the cylinder; a duct in the second closure member connecting the cylinder with the reservoir; a valve mechanism in said duct for restricting fluid flow therethrough in one direction to a greater degree than in the other direction; a piston reciprocative in said cylinder; means in the piston providing for the passage of fluid therethrough at a greater restricted rate in one direction than in the other; means extending through the said one closure member and secured to the piston for operating it; a sleeve secured to said one closure member spaced from and surrounding the cylinder and extending beneath the level of the fluid in the reservoir, the end of the sleeve secured to the closure member being flared to provide an annular chamber into which the discharge opening of the cylinder discharges; an orificed partition secured in the reservoir between the sleeve and reservoir wall; and a valve mechanism for restricting the movement of fluid through said orificed partition to a greater degree in one direction than in the other.

EDWIN F. ROSSMAN.

REFERENCES CITED

The following references are of record in the file of this patent:

UNITED STATES PATENTS

| Number | Name | Date |
|---|---|---|
| 2,324,058 | Boor et al. | July 13, 1943 |

FOREIGN PATENTS

| Number | Country | Date |
|---|---|---|
| 803,559 | France | Oct. 3, 1936 |